Jan. 26, 1971 S. A. ROTH 3,559,092

FREQUENCY DIVIDING SYSTEM

Filed Sept. 9, 1968 2 Sheets-Sheet 1

STEPHEN A. ROTH
*INVENTOR*

*BY*

*BUCKHORN, BLORE, KLARQUIST & SPARKMAN*
*ATTORNEYS*

Jan. 26, 1971 S. A. ROTH 3,559,092

FREQUENCY DIVIDING SYSTEM

Filed Sept. 9, 1968 2 Sheets-Sheet 2

STEPHEN A. ROTH
*INVENTOR*

*BY*

*BUCKHORN, BLORE, KLARQUIST & SPARKMAN*
*ATTORNEYS*

United States Patent Office 3,559,092
Patented Jan. 26, 1971

3,559,092
FREQUENCY DIVIDING SYSTEM
Stephen A. Roth, Beaverton, Oreg., assignor to Tektronix, Inc., Beaverton, Oreg., a corporation of Oregon
Filed Sept. 9, 1968, Ser. No. 758,416
Int. Cl. H03b 3/06
U.S. Cl. 331—16 15 Claims

ABSTRACT OF THE DISCLOSURE

A given signal is derived in accurately timed relation with a higher frequency signal, wherein the frequency of the latter signal is other than an integral multiple of the frequency of the given signal. A controlled signal generator produces the given signal, and the given signal is then divided down to a third frequency wherein the third frequency is desirably the largest common divisor of the given signal and the higher frequency signal. A phase detector sampler compares the phase of the higher frequency signal with the phase of the signal at the third frequency, and correction is made in the frequency of the given signal until the proper phase relation is achieved between the given signal and the higher frequency signal.

BACKGROUND OF THE INVENTION

Problems occur in the derivation of a given signal in phase-locked or accurately timed relation with a signal at a much higher frequency. In color television circuitry, for example in color bar generators or the like, the generation of the horizontal line scan frequency must be in accurately timed relation with the color subcarrier frequency. A generated frequency closely related to the color subcarrier frequency in a given instance was 4.43359375 megahertz, while the horizontal line frequency is 15,625 cycles per second. It will be observed that the higher frequency cannot be divided by an integer in order to procure the horizontal line frequency. Rather, the ratio of the two frequencies equals 1135/4 or 283¾. Conventional circuitry for obtaining the horizontal line frequency from the higher frequency first divides the color subcarrier frequency by 1135, and then multiplies the same by four. Frequency division by such a large number leads to frequency divider circuit complexities, and moreover, the aforementioned multiplication requires circuitry frequently exhibiting undesired phase jitter.

SUMMARY OF THE INVENTION

According to the present invention, a signal of a given frequency originates in a controlled signal generator and is locked in timed relation with a higher frequency, the latter frequency being other than an integral multiple of the given frequency. The signal at the given frequency is applied to a frequency divider providing division by a relatively small number for producing a third frequency which is a common divisor of both the given frequency and the aforementioned higher frequency. Phase detector means compares the phase of the third frequency with the phase of the higher frequency, and controls the given frequency to cause phase correspondence between the signals at the higher frequency and the third frequency. It will be seen that if the signal at the third frequency is caused to be synchronized in phase with the higher frequency, then the given frequency, from which the third frequency is derived, will also have an accurately fixed time relation to the higher frequency.

The system according to the present invention need employ only a relatively small frequency division, and furthermore avoids the use of frequency multipliers. According to a preferred embodiment of the present invention, additional signals are also supplied for producing time division of the aforementioned given frequency for the purpose of providing timing signals in a color bar generator or the like. In a preferred embodiment of the invention, both the generator of the given frequency and the generator of the aforementioned higher frequency are crystal controlled oscillators.

It is accordingly an object of the present invention to provide an improved frequency dividing system for deriving a given frequency in accurately timed relation with appreciably higher frequency.

It is a further object of the present invention to provide an improved frequency dividing system for deriving a signal in accurately timed relation with a signal at appreciably higher frequency wherein the higher frequency is other than an integral multiple of the given frequency.

It is another object of the present invention to provide an improved frequency dividing system for deriving a signal in accurately timed relation with a signal at an appreciably higher frequency, which is other than an integral multiple of the given frequency, without employment of complex dividing circuitry for dividing down the value of the higher frequency, and without employment of multiplier means.

The subject matter which I regard as my invention is particularly pointed out and distinctly claimed in the concluding portion of this specification. The invention, however, both as to organization and method of operation, may best be understood by reference to the following description taken in connection with the accompanying drawings wherein like reference characters refer to like elements.

DRAWINGS

DETAILED DESCRIPTION

Figure 1:
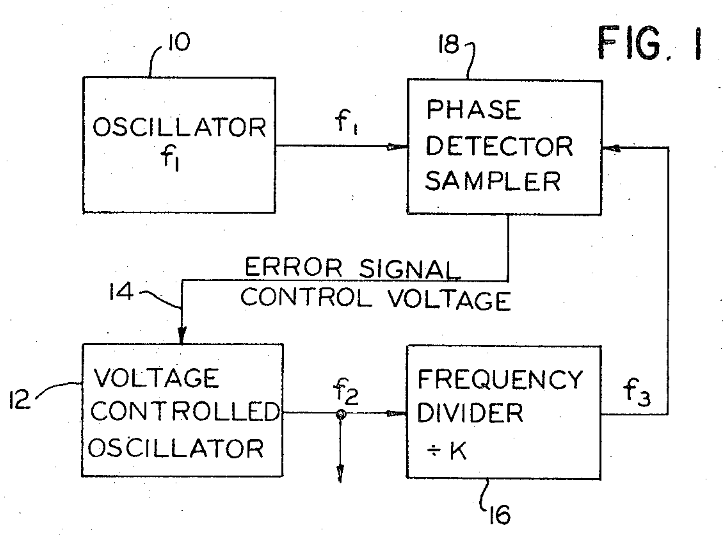
FIG. 1 is a block diagram of a circuit according to a first embodiment of the present invention.

Referring to FIG. 1, a first oscillator 10 preferably comprising a quartz crystal-controlled oscillator, provides a signal at a frequency of $f_1$. It is desired to provide a second signal at frequency $f_2$ in accurately timed relation with the first signal, e.g. wherein the first signal is a frequency of 4.43359375 megahertz, and the second signal is the television horizontal line frequency of 15,625 cycles per second. As hereinbefore mentioned, $f_1$ is thus typically much higher than $f_2$ and not an integral multiple of $f_2$. According to the present invention, the signal at frequency $f_2$ is produced in a controlled frequency signal generator means or oscillator 12, this oscillator having a control input 14 for varying the frequency $f_2$. Oscillator 12 is desirably a crystal oscillator which is voltage controllable within a relatively narrow frequency range. Frequency divider means 16 divides the signal at frequency $f_2$ by a small integer K to produce a third signal at frequency $f_3$, $f_3$ therefore being a submultiple of $f_2$. K is selected so that the frequency $f_1$ is also an integral multiple of $f_3$. That is, $f_3$ is selected to be a common divisor of $f_1$ and $f_2$, and is preferably the largest common divisor thereof.

The output of frequency divider means 16 is applied to means for comparing the phase of the first signal at frequency $f_1$ with the third signal at frequency $f_3$. The latter means suitably comprises a phase detector sampler 18 for sampling a portion of the waveform at frequency $f_1$ each time a selected portion of the signal at frequency $f_3$ occurs. If the signals at $f_1$ and $f_3$ are in desired phase relation, phase detector sampler 18 produces no error signal. However, should the two be other than in desired phase relationship, phase detector sampler 18 provides an error signal control voltage delivered to control input 14 of oscillator 12 for changing the frequency $f_2$ in a direction for maintaining accurate phase relation between the signals at frequencies $f_1$ and $f_3$. So long as the signals at frequencies $f_1$ and $f_3$ are in accurate phase relation, an accurate fixed time relation will then also exist between the signals at frequencies $f_1$ and $f_2$.

In a typical example, $f_1$ equals the aforementioned frequency of 4.43359375 megahertz, closely related to a television color subcarrier frequency, and $f_2$ equals 15,625 cycles per second. K is chosen to be four, in which case $f_3$ equals 3906.25 cycles per second, or the largest common divisor of $f_1$ and $f_2$. According to the FIG. 1 circuit, the signal at frequency $f_2$ is controlled in phase relative to the signal at frequency $f_1$ without the employment of a long divider chain for producing a signal on the order of frequency $f_2$ directly from $f_1$, and without multiplier means.

Figure 2:
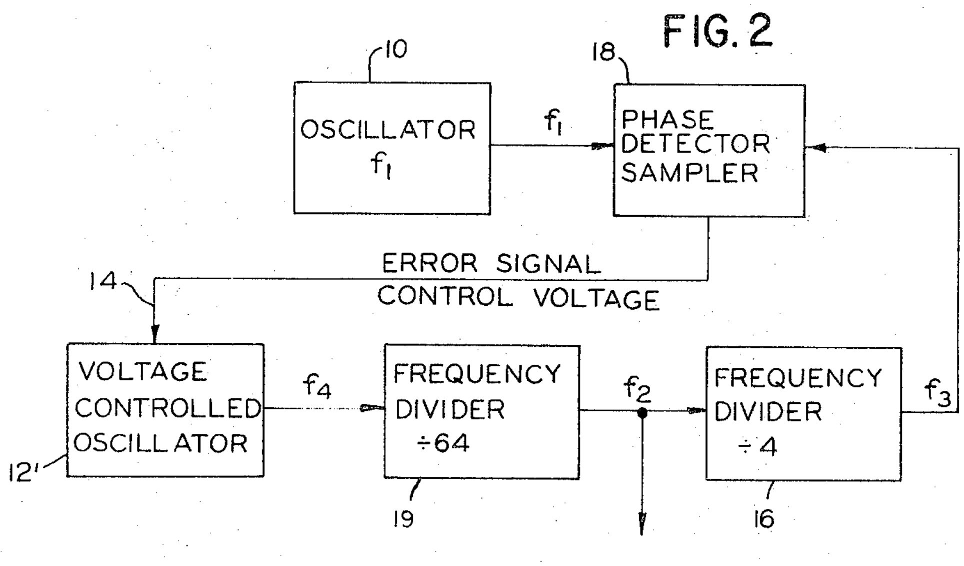
FIG. 2 is a block diagram of a circuit according to a second embodiment of the present invention.

A second embodiment of the present invention is illustrated in block diagram form in FIG. 2 wherein like reference characters are employed to refer to like elements. This circuit operates in substantially the same manner as FIG. 1 except that the control frequency signal generator here comprises a voltage controlled oscillator 12′ for producing a signal at a frequency $f_4$, and further includes additional frequency divider means 19. The oscillator 12′ is desirably a quartz crystal oscillator, the frequency of which is controlled within a narrow range.

The FIG. 2 circuit provides two advantages. First, oscillator 12′ produces a signal at frequency $f_4$ which may be somewhat higher than the horizontal scanning rate and therefore which is easier to produce in an oscillator employing conventional components. Furthermore, the additional frequency divider means 19 makes possible the operation of gating means (not shown in this figure) for producing time division of the $f_2$ signal. Thus, if $f_2$ is at the horizontal scanning rate, signals may be derived from frequency divider 19 for dividing up the horizontal scan into a number of portions, e.g. for generating color bars in a television color bar generator.

In a typical instance, wherein the frequencies $f_1$, $f_2$, and $f_3$ have the numerical values hereinbefore described by way of example, $f_4$ is arranged to be one megahertz, a frequency easily generated in crystal oscillator 12′. In this case, frequency divider 19 divides by a factor of 64. and supplies an output at frequency $f_2$, the horizontal line frequency of 15,625 cycles. The horizontal line frequency is again divided by four in order to produce the signal at frequency $f_3$, 3906.25 cycles.

Figure 3:
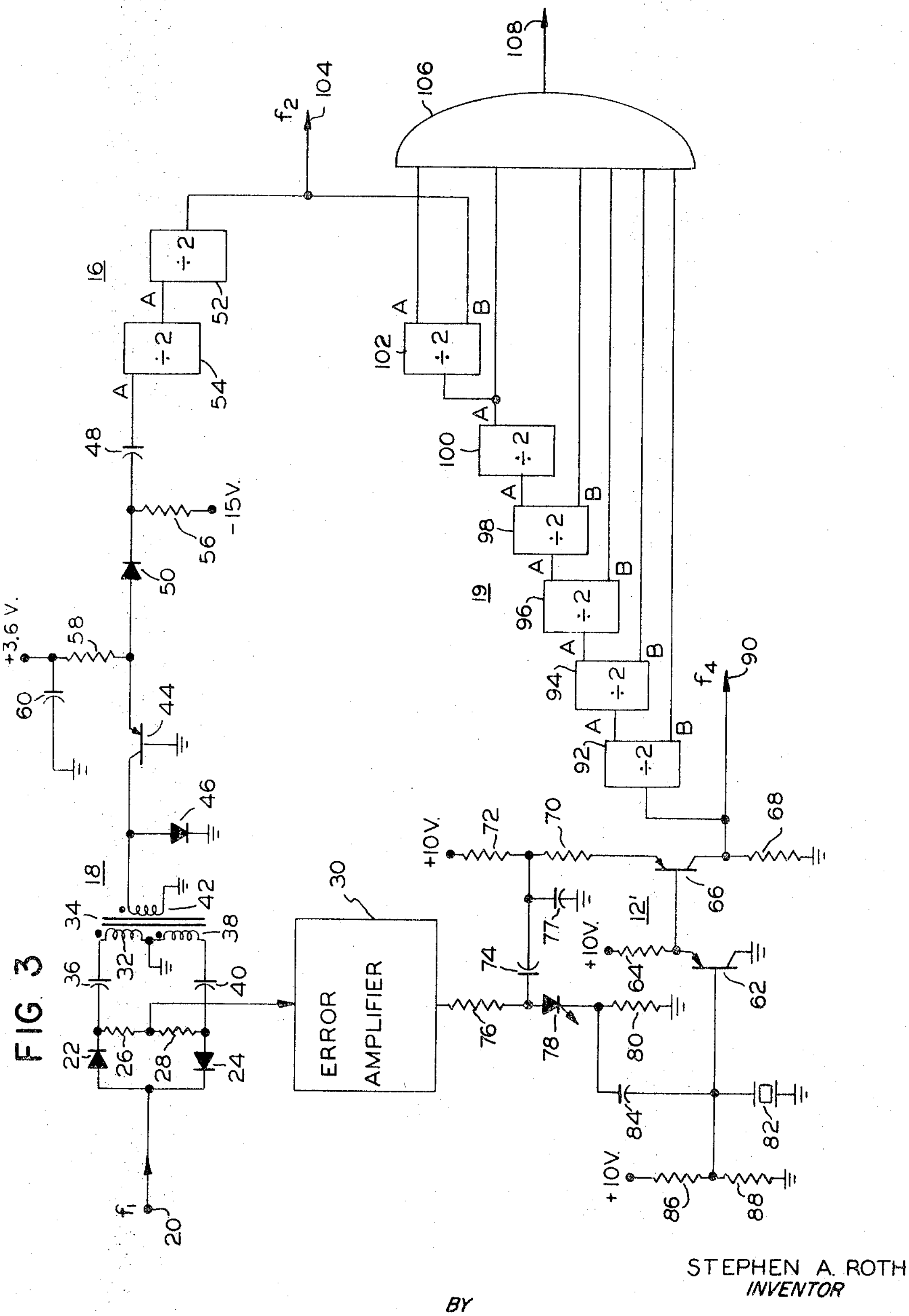
FIG. 3 is a schematic diagram of such second embodiment.

FIG. 3 is a schematic diagram further illustrating a large part of the FIG. 2 circuit, wherein like portions are indicated by like reference numerals. The signal at frequency $f_1$ is derived from a conventional quartz crystal-controlled oscillator (not shown in this figure). The signal at frequency $f_1$, which may be supplied across a parallel resonant circuit resonant at $f_1$ and returned to ground (not shown), is coupled to input terminal 20 of a phase detector sampler 18. The phase detector sampler comprises diodes 22 and 24, the first having its anode connected to terminal 20, and the latter having its cathode connected to terminal 20. The remaining terminals of the diodes are joined by means of a series voltage divider comprising resistors 26 and 28, the center tap of which provides an output to error amplifier 30. The cathode of diode 22 is also coupled to winding 32 of transformer 34 through capacitor 36, the opposite end of winding 32 being returned to ground. Similarly, the anode of diode 24 is coupled to transformer winding 38 through capacitor 40, with the remaining terminal of winding 38 being returned to ground. Another winding, 42, of transformer 34, comprising a primary winding thereof, is connected between ground and the collector of PNP transistor 44, as well as being shunted by diode 46 the anode of which is connected to the collector of transistor 44. The base of transistor 44 is grounded while the emitter thereof receives an input from frequency divider 16 through capacitor 48 and diode 50 serially coupled in that order between divider stage 54 and the transistor's emitter. The anode of diode 50 is connected to the emitter of transistor 44. The cathode of diode 50 is connected to capacitor 48 and is also returned to a source of −15 volts through resistor 56. The junction between diode 50 and the emitter of the transistor is coupled to +3.6 volts through resistor 58, the voltage source being bypassed to ground via capacitor 60.

The oscillator 12′ comprises a PNP transistor 62 having its collector grounded, and its emitter returned to +10 volts through resistor 64. Transistor 62, which is connected in emitter-follower fashion, has its emitter coupled in driving relation to the base of PNP transistor 66, the collector of which is returned to ground via resistor 68. The emitter of transistor 66 is connected to +10 volts through resistor 70 in series with resistor 72 wherein the midpoint of the resistors is connected to a feedback capacitor 74, and to a shunt capacitor 77 the opposite terminal of which is grounded. The output of error amplifier 30 is coupled through resistor 76 to variable capacitance diode 78, the diode being returned to ground through resistor 80 for direct currents. The remaining end of feedback capacitor 74 is also connected to the junction between resistor 76 and diode 78, while the junction between diode 78 and resistor 80 is coupled to one side of quartz crystal 82 through a feedback capacitor 84. The quartz crystal 82 is connected between the base of transistor 62 and ground, with the base also being biased at the midpoint of a voltage divider comprising resistors 86 and 88 disposed between +10 volts and ground.

The frequency of the oscillator is crystal controlled by quartz crystal 82 to be substantially one megacycle in this example, but the exact frequency of the oscillator can be altered within narrow limits because the variable capacitance diode 78 is located in the oscillator's feedback circuit, i.e. in the circuit between the emitter of transistor 66 and the base of transistor 62. The capacitance of this diode is changed by the output from error amplifier 30, and in effect shunts crystal 82 to a greater or lesser extent with the capacitance of capacitor 77. The parallel capacitance of the crystal is thus changed to a slight degree whereby the output frequency of the oscillator is changed slightly. The crystal oscillator is otherwise conventional, except for transistor 62 included as an emitter-follower in order to reduce the loading on the crystal 82 and enable a predictable loop gain for the oscillator.

The output 90 of the oscillator at approximately one megacycle is applied to a frequency divider 19 which comprises a plurality of individual divider circuits or binaries 92, 94, 96, 98, 100, and 102. Each of these binaries, or flip-flops, changes its state when the input thereof goes from a positive condition to a negative condition. Thus, when the oscillator output wave at output terminal 90 makes a negative-going excursion across its zero axis, binary 92 changes its state so its output at terminal A thereof changes from negative to positive, or vice versa. Each of the binaries 94, 96, 98, 100, and 102, receives, as its input, the A output of the previous binary.

It will be seen that each binary comprises a divide-by-two circuit. Each successive binary changes its state only half as often as the previous binary, or as the oscillator produces twice as many cycles at a one megacycle rate. The output at terminal B of each of the binaries is the inverse of the output at terminal A. It will be seen that the output at terminal 104, connected to the terminal B output of binary 102, will be one megahertz/$2^6$ =one megahertz/64=15,625 cycles or the desired horizontal frequency. In other words, the output 90 of the oscillator is $Nf_2$, where N=64. $Nf_2$ corresponds to $f_4$ in FIG. 2. The output 104 is connected to the input of a frequency divider 16 comprising a pair of similar cascaded binaries 52 and 54 which produce a division by four.

In operation of the FIG. 3 circuit, when binary 54 changes its state, whereby the output A of binary 54 changes from a positive condition to a negative condition, current theretofore flowing from resistor 58 to the emitter of transistor 44 will now flow through diode 50 and resistor 56, because of the negative potential coupled to the cathode of diode 50 through capacitor 48. As a result of the cessation of current into transistor 44, this transistor will cease conducting, producing a negative-going excursion at its collector and therefore at the marked terminal of winding 42. The polarity of this excursion, coupled via transformer 34 and capacitors 36 and 40, is such as to bias diodes 22 and 24 into conduction whereby a signal input can be delivered to amplifier 30. The length of time these diodes conduct depends to a large extent upon the time constant of the circuit, and occurs only once every 3906.25 cycles, i.e. 15,625/4. The sampling duration is less than half a cycle at the frequency $f_1$, and therefore the sampler 18 "looks at" less than half a cycle of the signal at frequency $f_1$. If the time of occurrence of this sampling takes place when the wave at frequency $f_1$ crosses the zero or ground level axis, an average zero output will be produced at the junction of resistors 26 and 28 through diodes 22 and 24. The response of amplifier 30 is such that it produces substantially no output. However, if the sampling occurs at a slightly earlier or slightly later time, an error signal will be produced and delivered to error amplifier 30 which will operate variable capacitance diode 78 for changing the frequency of oscillator 12' in a direction to bring the error to zero. Therefore, the output 90 of the oscillator is controlled such that an output 104 of the circuit is produced at the horizontal line frequency, such output having an accurately timed relation with the input signal at frequency $f_1$.

Each time the operation of phase detector sampler 18 concludes, that is, when transistor 44 returns to conduction, the transistor will draw collector current providing energy to transformer 34. Diode 46 acts to prevent ringing in transformer 38. A charge will be left on capacitors 36 and 40, positive at the cathode of diode 22 and negative at the anode of diode 24, thereby effectively shutting these diodes off until the next sampling period.

An additional advantage of the FIG. 3 circuit is the provision of time division signals related to the horizontal line frequency. Thus, it will be observed that each binary in divider 19 starting with binary 102 and proceeding backwards, will have an output double in frequency to the prior binary. These outputs can be employed in order to provide markers along a horizontal line trace of a cathode ray tube portrayal, or may be gated to provide a signal at a particular time along a horizontal line trace. In the specific example illustrated in FIG. 3, the B outputs of binaries 92, 94, 96, and 98, as well as the A outputs of binaries 100 and 102, are applied to and-gate 106. And-gate 106 then provides output 108 fifteen microseconds after the start of each horizontal line as initiated by the output at 104. Obviously, the outputs of the binaries may be gated in various ways to produce various time divisions of a horizontal line trace.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A system for providing a second signal at a second frequency in accurately timed relation with a first signal at a first and higher frequency, comprising:

a controlled signal generator means for generating said second signal at said second frequency, frequency divider means for receiving said second signal at said second frequency from said signal generator means and supplying a third frequency which is a submultiple of both said second frequency and said first frequency, and means for comparing said first signal with said third signal and controlling said controlled signal generator means in response to the comparison for maintaining the predetermined submultiple relation between said third signal and said first signal and therefore between said second signal and said first signal.

2. A system for providing a second signal at a second frequency in accurately timed relation with a first signal at a first and higher frequency which is other than an integral multiple of said second frequency, comprising:

a controlled frequency signal generator means for providing said second signal at said second frequency and having a control input for varying the frequency of said signal generator means at least within a limited range, frequency divider means for receiving said second signal at said second frequency from said signal generator means and for supplying a third signal at a third frequency which is a submultiple of said second frequency, wherein said first frequency is an integral multiple of said third frequency, and means for comparing the phase of said first signal with the phase of said third signal and for generating an error signal when the first and third signals are in other than predetermined phase relation for application to said control input of said signal generator to change the value of said second frequency in a direction for maintaining accurate phase relation between said third signal and said first signal and for therefore maintaining an accurately fixed time relation between said second signal and said first signal.

3. The system according to claim 2 wherein the controlled frequency signal generator means includes a frequency generator producing a fourth signal at a fourth frequency which is an integral multiple of said second frequency, and further including additional frequency divider means receiving said fourth signal and supplying said second signal.

4. The system according to claim 2 wherein said third frequency is the largest common divisor of said first frequency and said second frequency.

5. The system according to claim 2 wherein said means for comparing the phase of said first signal with said third signal comprises a sampler circuit operative to sample a predetermined portion of the waveform of the first signal at the time of occurrence of a predetermined portion of the waveform of the third signal.

6. The system according to claim 2 including means for providing said first signal comprising a crystal oscillator.

7. The system according to claim 6 wherein said controlled frequency signal generator means also comprises a crystal oscillator.

8. The system according to claim 2 wherein said controlled frequency signal generator means comprises a voltage controlled oscillator.

9. The system according to claim 8 wherein said oscillator provides a fourth signal at a fourth frequency which is an integral multiple of said second frequency, and further including additional frequency divider means receiving said fourth signal and supplying said second signal.

10. The system according to claim 9 wherein said fourth signal divided by N, where N is an integer, is employed to porduce time division of said second signal.

11. The system according to claim 9 further including gate means and wherein outputs of frequency divider means operate said gate means to produce time division of said second signal.

12. A system for providing a second signal at frequency $Nf_2$, where N is an integer, in accurately timed relation with a first signal at frequency $f_1$ higher than $f_2$ and which is other than an integral multiple of $f_2$, comprising:

a controlled frequency signal generator for providing a signal at said frequency $Nf_2$, said generator having a control input for varying the frequency of said signal generator at least within a limited range, frequency divider means for receiving said signal at the frequency $Nf_2$ from said signal generator and supplying a signal at a frequency $f_3$ which is a submultiple of $f_2$, $f_1$ being an integral multiple of $f_3$, and means for comparing said first signal with said signal at frequency $f_3$ and for controlling said controlled frequency signal generator in response thereto for maintaining its output signal at frequency $Nf_2$ such that the signal at frequency $f_3$ has a predetermined phase relation with said first signal, and therefore for maintaining an accurately fixed time relation between the signal at frequency $Nf_2$ and said first signal.

13. The system according to claim 12 including means for deriving submultiples of said signal at the frequency $Nf_2$ from said divider means, including a submultiple at frequency $f_2$.

14. The method of providing a second signal at a second frequency in accurately timed relation with a first signal at a first and higher frequency, comprising:

generating said second signal, dividing the frequency of said second signal to provide a third frequency which is a submultiple not only of said second frequency but also of said first frequency, comparing the first signal with the third signal to produce an error indication when the first and third signals are not in predetermined submultiple relation, and controlling the frequency of the second signal in response to said error indication, changing the value of said second frequency in a direction for maintaining said submultiple frequency relation between the second signal and the first signal.

15. The method of providing a second signal at a second frequency in accurately timed relation with the first signal at a first and higher frequency, which is other than an integral multiple of said second frequency, comprising:

generating said second signal in the frequency range of said second frequency, dividing the frequency of said second signal to provide a third signal at a third frequency which is an integral submultiple of the desired second frequency and which is an integral submultiple of said first frequency, comparing the phase of the first signal with the phase of the third signal and generating an error signal when the first and third signals are in other than predetermined phase relation, and changing the value of said second frequency, in response to said error signal, in a direction for maintaining accurate phase relation between the third signal and the first signal and for therefore maintaining an accurate submultiple frequency relation between the second signal and the first signal.

References Cited

UNITED STATES PATENTS

| | | | |
|---|---|---|---|
| 2,521,058 | 9/1950 | Goldberg | 331—27 |
| 2,840,711 | 6/1958 | Miller | 331—28 |
| 3,319,178 | 5/1967 | Broadhead, Jr. | 331—2 |

JOHN KOMINSKI, Primary Examiner

U.S. Cl. X.R.

178—5.4, 69.5; 331—18